Patented Nov. 14, 1944

2,362,512

UNITED STATES PATENT OFFICE 2,362,512

METALLURGY

Marvin J. Udy, Niagara Falls, N. Y.

No Drawing. Application June 23, 1941,
Serial No. 399,415

4 Claims. (Cl. 75—27)

This invention relates to metallurgy and has for an object the provision of improved metallurgical processes or methods and products. More particularly, the invention contemplates the provision of improved methods of producing chromium-bearing alloys, improved products and materials for use in the production of chromium-bearing alloys and improved methods of producing such materials and products. An important object of the invention is to provide an improved method for treating low-carbon, high-silicon ferrochrome silicon to eliminate any desired proportion of the silicon and form products containing silicon in controlled amounts as, for example, products usually identified as low-carbon ferrochromium and products similar to low-carbon ferrochromium but containing silicon in greater amount than that in which it is commonly present in products identified as low-carbon ferrochromium, such products being designated as low-carbon, low-silicon ferrochrome silicon.

This application is a continuation-in-part of my application Serial No. 337,679, filed May 28, 1940 (issued as Patent No. 2,247,263) and of my application Serial No. 303,363, filed November 8, 1939.

It has been proposed heretofore to produce low-carbon ferrochromium and low-carbon, low-silicon ferrochrome silicon by reducing chromite ore with coke to form high-carbon ferrochromium, then smelting the high-carbon ferrochromium with coke and silica to form low-carbon ferrochrome silicon and, finally, eliminating the silicon from the ferrochrome silicon by oxidation. Oxidation of the silicon of the ferrochrome silicon may be carried out in several stages. In the first stage, the ferrochrome silicon in finely divided form may be incorporated in a self-propagating reaction mixture with chromium-bearing material such as chromite ore and oxidizing material such as sodium nitrate, and the reaction mixture ignited. The resulting reaction produces slag and molten low-carbon ferrochrome silicon containing silicon in an amount which may be as low as about five percent by weight. The low-silicon, low-carbon ferrochrome silicon thus produced is subsequently smelted with chromite ore in an open-arc electric furnace to effect further elimination of silicon.

In the smelting of high-carbon ferrochromium with silica and coke, silicon of the silica is reduced and enters the molten ferrochromium, forming ferrochrome silicon and causing elimination of carbon. The amount of carbon eliminated depends upon the amount of silicon introduced into the metal within certain limits. In the case of high-chromium ferrochromium, the carbon content can be reduced readily to an amount in the neighborhood of about 0.10 percent by incorporating sufficient silicon to form ferrochrome silicon containing about forty percent of silicon. The carbon content is only slightly further diminished as the silicon content is increased above forty percent. Even when amounts of silicon equal to or greater than fifty percent of the weight of the resulting ferrochrome silicon are incorporated, the carbon content is rarely reduced below about 0.04 percent of the weight of the ferrochrome silicon. Since it is desirable to produce low-carbon ferrochromium containing not more than 0.10 percent carbon, it is customary to incorporate at least about fifty percent of silicon in the ferrochrome silicon in an effort to assure the production of ferrochromium containing substantially less than 0.10 percent carbon upon elimination of the silicon. The production of ferrochromium of such desirably low-carbon content is difficult to accomplish when the final stage of oxidation of the silicon is carried out in an open-arc electric furnace because of carbon pick-up resulting from the use of carbon electrodes.

In producing low-carbon ferrochromium in accordance with the methods of the present invention, advantage is taken of the reducing capacity of the silicon employed for carbon elimination to dilute the ferrochrome silicon with iron and chromium and further reduce the ratio of carbon to iron and chromium. Also, the invention effects the final carbon elimination through oxidation by means of substantially carbon-free oxidizing material in an environment free of contaminating carbon.

Methods proposed heretofore for preparing low-carbon chromium alloys of the type of low-silicon ferrochrome silicon and ferrochromium have not always been entirely satisfactory. In employing the exothermic reaction mixtures of the methods proposed heretofore, it is difficult or impossible to produce low-silicon ferrochrome silicon products of uniform composition with respect to silicon, and such products sometimes are contaminated with undesirable amounts of carbon. It is difficult also to produce low-carbon ferrochromium of uniform composition with respect to carbon. Non-uniform results with respect to silicon elimination in the heretofore customary types of processes employing exothermic reaction mixtures for silicon elimination may be attributed to inefficient reduction of the iron and chromium of chromite ore employed for oxidation of the silicon resulting from ineffective mixing of the reagents. Carbon contamination in low-silicon ferrochrome silicon and in ferrochromium is attributable to the presence of carbon in reagents such as chromite ore employed for silicon removal and to carbon pick-up resulting from the use of carbon electrodes in open-arc electric furnaces employed for final silicon elimination.

My investigations have demonstrated that the efficiency of reduction of iron and chromium of chromite ores and control of residual silicon in the metal products formed may be improved by providing for more intimate contact of the components of the mixture and by providing exothermicity of a degree such that the chromite ore is subjected to the action of the ferrochrome silicon in a softened or molten condition. My investigations have demonstrated also that carbon pick-up with resulting contamination is attributable, in part at least, to carbon present as organic carbon or in carbonate form or as both organic carbon and carbonate carbon in the chromite ore, and I have found that more effective control of carbon in the metal products formed can be accomplished by treating the chromite ore to effect carbon removal prior to incorporating the ore in the reaction mixture.

A desirable degree of intimate mixing may be accomplished by employing the components in the form of particles of suitably small sizes. In accordance with the invention, particles of suitably small sizes may be obtained by subjecting the ore in solid, finely divided form to an oxidizing operation to effect oxidation of a portion of the chromium to the hexavalent condition. Such partial oxidation of the chromium takes place on the outer surfaces of the particles with the result that the residual chromite ore particles are smaller in size than the ore particles initially subjected to oxidation. Improved exothermicity is promoted by intimate mixing and by careful adjustment of reagents in the reaction mixture. Control of exothermicity in producing exothermic reaction mixtures of the invention may be accomplished advantageously by adjusting the proportions of components of the mixtures in accordance with the principles and procedures described in my United States Patents Nos. 2,243,783 and 2,243,784.

Carbon removal may be effected by an oxidation treatment carried out at a temperature sufficiently high to effect combustion of organic carbon and decomposition of any carbonate present. Usually, both organic carbon and carbonate carbon can be removed effectively by heating finely divided chromite ore in air, or in the presence of any suitable solid or gaseous oxidizing agent or material containing oxygen available for reaction with the organic carbon, to a temperature of about 1000° C. For carbon removal and for conversion of a portion of the chromium to the hexavalent state, the chromite ore preferably is ground or comminuted to convert it to the form of particles small enough to pass a 100-mesh screen, and the ore is subjected to the oxidizing treatment in the resulting finely divided or powdered form.

Oxidation of the chromite ore may be carried out in accordance with known procedures to produce a product containing desired chromate compounds such, for example, as calcium chromate and sodium chromate. An oxidation or roasting charge may comprise chromite ore, lime and an alkali metal compound, such as sodium carbonate, sodium chromate and sodium dichromate, all in finely divided forms and in intimate admixture and in proportions such as to effect the desired conversion of chromium to the hexavalent state and the production of calcium chromate and alkali metal chromate in the desired proportion. Roasting or oxidation may be carried out in air effectively at temperatures up to about 1000° C. In a preferred method of producing exothermic reaction mixtures in accordance with the invention, oxidation is controlled to prevent complete conversion of the trivalent chromium of the chromite ore to the hexavalent state. Usually, conversion of not more than about fifty percent of the chromium of the chromite ore to the hexavalent state can be carried out to produce effective reduction in size of the original small particles of chromite ore and to produce chromate compounds which contribute effectively to the exothermicity of any reaction mixture of the invention in which the roasted or oxidized product may be employed. The roasting or oxidation results in conversion of the chromium of the surface portions of the chromite ore particles to chromate compounds, leaving small cores or nuclei of unaltered chromium ore. These small nuclei or cores of chromite ore are admirably suited for use in promoting the accomplishment of the degree of intimate mixing of components of exothermic reaction mixtures which provides optimum reacting conditions.

In producing various exothermic reaction mixtures in accordance with the invention, any suitable oxidizing material capable of reacting with the silicon of the ferrochrome silicon to develop a suitably high temperature higher than the temperature capable of being developed by reaction of the silicon with the reducible iron and chromium compounds of unaltered chromite ore may be employed in conjunction with oxidized chromite ore. The additional oxidizing material may comprise a compound, such as sodium nitrate or sodium chlorate, which is free of any metallic element reducible to the elemental state by the silicon, or, it may comprise a compound containing a metallic element reducible to the elemental state by the silicon such, for example, as sodium chromate, sodium dichromate and calcium chromate. When it is desired to increase the quantity of metallic chromium produced by reaction over that capable of being produced by reduction of the reducible compounds of the chromite ore, I prefer to employ additional oxidizing material comprising a chromate compound.

Exothermic reaction mixtures produced in accordance with the invention may contain sufficient lime to result, upon ignition and reaction, in the production of a fluid slag by combination with the acid slag-forming material such as silica produced by the reaction, or, lime (CaO) in amount suitable for producing slag of the desired composition may be added to the furnace or other reaction vessel. Lime included in a reaction mixture preferably should be chemically combined with acid slag-forming material such, for example, as the iron oxide, alumina and chromic oxide of the chromite ore, to prevent water and carbon dioxide pick-up from the atmosphere if the reaction mixture is to be stored for any substantial period of time prior to use. Chemical combination of the lime with the constituents of the ore may be effected by heating the lime and the chromite ore in finely divided forms and in intimate admixture to an elevated temperature. A temperature of about 1000° C. to 1200° C. produces effective chemical combination when the lime and ore particles are small enough to pass a 100-mesh screen.

Exothermic reaction mixtures may comprise (1) natural chromite ore in finely divided, but otherwise untreated form or (2) chromite ore in finely divided form which has been treated for the removal of organic and carbonate carbon but which has not been subjected to oxidation to convert chromium contained therein to the hexavalent state or both in addition to (3) chromite ore contained in chromate-bearing oxidized material resulting from oxidation of finely divided chromite ore to convert trivalent chromium to the hexavalent state and to reduce the sizes of the chromite ore particles comprising the initial roasting or oxidation charge. Any combination of treated and untreated chromite ore-bearing products may be incorporated in a reaction mixture of the invention. Oxidation of the chromite ore to produce hexavalent chromium results also in elimination of organic and carbonate carbon. When untreated ore, or ore untreated otherwise than for carbon removal, is employed, it is advisable to employ the reaction mixtures in the form of solid agglomerates in which the components are intimately mixed with and bonded together by means of the oxidizing material. Bonding of the components of the reaction mixtures by means of the oxidizing material produces highly desirable intimate mixing of the oxidizing material and the other components by effecting thorough wetting or coating of the other components with the oxidizing material. Reaction mixtures comprising chromite ore-bearing and chromate-bearing oxidized ore products may be employed effectively in powdered form, packaged form or as agglomerates in which the particles are bonded together by the oxidizing material or by other suitable material.

In the preferred exothermic reaction mixtures of the invention, all reacting materials preferably are present in the form of particles small enough to pass a 100-mesh screen. When the oxidizing material functions as the bonding agent for other components in an agglomerate, it is widely disseminated throughout the agglomerate in the form of thin films or coatings on the solid particles of other components.

An exothermic reaction mixture of the invention may comprise solid, finely divided chromite ore; solid, finely divided ferrochrome silicon; and oxidizing material capable of reacting exothermically with the silicon of the ferrochrome silicon to develop a temperature higher than that resulting from reaction of the silicon with compounds of iron and chromium contained in the chromite ore. Preferably, the components of the reaction mixture are present in such quantities and are so proportioned that the silicon of the ferrochrome silicon is capable upon ignition of the reaction mixture of reacting with the oxidizing material to generate sufficient heat to melt the chromite ore and promote reduction of the iron and chromium compounds of the ore by the silicon, and the silicon is present in the reaction mixture in an amount sufficient to react with all of the oxidizing material and a large proportion of the iron and chromium compounds of the ore.

The exothermic reaction mixtures of the invention may be of such compositions as to be capable of producing molten metal such as low-carbon ferrochromium or low-carbon, low-silicon ferrochrome silicon upon ignition (1) on the surface of a molten bath of metal such as ferrochromium, or (2) in a previously unheated environment with or without preheating of the mixtures or (3) in a heated environment in the absence of a molten bath as in a crucible or ladle. The invention also contemplates the production of reaction mixtures of relatively low exothermicity which may be employed most advantageously in electric furnaces such as open-arc electric furnaces. The heat developing capacity of any reaction mixture produced in accordance with the invention preferably will be determined on the basis of the contemplated use of the reaction mixture. For example, if the reaction mixture is to be pre-heated, or if the reaction mixture is to be ignited in contact with molten metal or placed for reaction in a crucible or ladle previously heated to a relatively high temperature and containing excess heat available for melting or for aiding in melting ore, metal present as such in the mixture and any metal which may be produced by reaction upon ignition of the mixture, the components of the reaction mixture may be so selected and proportioned as to provide a relatively low heat developing capacity. If, on the other hand, the reaction mixture is to be ignited in contact with relatively cold molten metal containing no available excess heat for melting or for aiding in melting ore and metal, or, if the reaction mixture is to be ignited in contact with molten metal the temperature of which should be increased, or, if the reaction mixture is to be ignited in a previously unheated environment, the components of the reaction mixture may advantageously be so selected and proportioned as to provide a relatively high heat developing capacity in order to melt the ore, metal present as such and any metal which may be produced by reaction upon ignition of the mixture and to establish the molten metal at the desired temperature.

The various components of the reaction mixtures may be of such natures and so proportioned that ignition will initiate a reaction capable of producing metal products containing large proportions of the iron and chromium of the mixtures substantially in the proportions in which those elements are present in the mixtures. The low-carbon, high-silicon ferrochrome silicon and the oxidizing material may be so proportioned in any reaction mixture that the metal product resulting from ignition and reaction will be substantially free of silicon or will contain a predetermined amount of silicon. A mixture designed for use in the production of ferrochromium preferably will contain material capable of oxidizing silicon in amount such that ignition and reaction will result in oxidation of substantially all of the silicon with the production of a metal product containing less than about one percent (1%) of silicon by weight. A mixture designed for use in the production of low-carbon, low-silicon ferrochrome silicon preferably will contain low-carbon, high-silicon ferrochrome silicon containing not less than about forty percent (40%) of silicon by weight and material capable of oxidizing silicon in amount such that ignition and reaction will result in oxidation of sufficient silicon to effect the production of a metal product containing not less than about four percent (4%) and not more than about twenty percent (20%) of silicon by weight. Low-carbon, low-silicon ferrochrome silicon containing silicon in the range four to twenty percent (4 to 20%) by weight and, preferably, in the range five to fifteen percent (5 to 15%) by weight can be employed advantageously in the production of exothermic reaction mixtures for use in the production of chromium-bearing alloys as described in my copending application Serial No. 303,363, filed November 8, 1939.

In proper cases, reaction mixtures of the invention may be agglomerated in any suitable manner as by means of an inert bonding agent such as sodium silicate or by means of an agent such as an oxidizing agent capable of taking part in reactions with other components. I prefer to form agglomerates by employing oxidizing materials capable of functioning as bonding agents for the particles of the mixtures. The oxidizing agents may be employed in finely divided condition or they may be employed in the molten state or in the solid state resulting from solidification from the molten state, or resulting from precipitation or crystallization from solution, after mixing with the other components. Bonding by means of the oxidizing agents may be of the type effected through the application of high pressures to quantities of the mixtures; it may be of the type effected through moistening, as with an aqueous liquid, compacting and heating to drive off moisture; or it may be of the type effected by solidification of the oxidizing agents from the molten state in contact with the other components. Contact of the other components of the reaction mixtures with the oxidizing agents while molten or in solution causes effective wetting and coating of the other components with the oxidizing agents and provides for more effective reaction upon ignition. When an oxidizing agent is employed in the solid state resulting from solidification from the molten state, or precipitation or crystallization from solution, it serves as a bonding agent for bonding together in intimate association the other components of the mixture. Reaction mixtures containing calcium chromate or sodium chromate or both may be effectively agglomerated through the bonding action of the sodium chromate or calcium chromate or both by moistening the mixtures with water, molding agglomerates under pressure and heating the agglomerates to temperatures sufficiently high to drive off free and combined water. All or a large proportion of oxidizing agents such as calcium chromate and sodium chromate may be produced in the oxidation treatment of the chromite ore.

The oxidizing agent employed in forming reaction mixtures when fusion is to be carried out should be selected to insure a fusing point below the temperatures at which ignition of the mixture, with resulting reaction, will take place. Oxidizing agents having suitably low fusing or melting temperatures include many of the oxygen-bearing compounds of alkali metals such, for example, as sodium nitrate, sodium chlorate and sodium bichromate. Other oxidizing agents which may be employed in forming the reaction mixtures when incorporation of chromium or manganese in the resulting product is sought, include calcium chromate, sodium chromate and manganese dioxide.

Agglomerates in which the oxidizing material serves as the bonding agent may be produced in any suitable manner. The components which enter into the reactions upon ignition, such as the ferrochrome silicon, the oxidizing material and the chromite ore may be ground together to effect intimate mixing, and the resulting mixture may be heated to a temperature sufficiently high to effect fusion of the oxidizing agent without igniting the reaction mixture. Fusion may be carried out in vessels or pans of the sizes and shapes of the agglomerates sought to be produced, in which case the agglomerates may be permitted to cool and solidify in place, or, fusion may be carried out in a master vessel, and the fused mass may be poured into suitable molds for cooling and solidification.

In bonding together the components of a reaction mixture by means of the oxidizing material, I may moisten the mixture with an aqueous liquid, form the resulting wet mass into agglomerates under pressure and heat the agglomerates to drive off the water. This procedure produces strong solid agglomerates in many cases even when the agglomerates are heated to a temperature below the fusing temperature of any low fusing point oxidizing agent which may be present in the mixture. Amounts of water equal to about one to five percent (1 to 5%) of the mixture may be employed satisfactorily for wetting a mixture. Wetting and molding may be desirable even when fusion of an oxidizing component of a mixture is to be carried out.

The following example illustrates a roasting procedure which may be employed advantageously in the production of oxidized ore for use in producing reaction mixtures of the invention:

Ore analysis:

|   | Per cent |
|---|---|
| $Cr_2O_3$ | 44.0 |
| FeO | 23.8 |
| $SiO_2$ | 6.2 |
| $Al_2O_3$ | 13.8 |
| MgO | 8.3 |
| CaO | 3.0 |

Ore of the above composition was mixed with limestone (containing 53% CaO) and soda ash in the following proportions by weight:

|   | Parts |
|---|---|
| Ore | 100 |
| Limestone | 90 |
| Soda ash | 5 |

The mixture was ground to form a finely divided product consisting largely of particles small enough to pass a 100-mesh screen. The finely divided product was roasted in air at a maximum temperature of 1100° C. for a period of time equal to about one and one-half hours. The product of the roasting treatment contained about 18.2% of chromium, and about 35% of the chromium was present as chromate.

The time of roasting, fineness of grinding and ratio of CaO to $Na_2O$ in the mix may be varied to give varying amounts of chromate as may be desired. Different ores require variations in the mix to obtain the desired results.

The object in the roasting is four-fold, namely, (1) to remove extraneous carbon such as wood carbon, (2) to remove practically all $CO_2$, (3) to combine lime (CaO) with the iron, aluminum and chromium oxides of the ore and (4) to produce the desired amount of chromate.

In some cases I prefer to sinter the ore and limestone at high temperature, 1200° C. or higher, and then add a small amount of soda ash and roast at a low temperature, 600° C. to 1100° C., to produce the desired amount of chromate. The advantages in sintering are (1) complete combination of lime (CaO) with the oxides of the ore and (2) greater production of calcium chromate with smaller amounts of soda in proportion.

In some cases, it is preferable to roast a part of the ore to practically complete chromate formation and mix the product with ore roasted solely for carbon removal or roasted ore of lesser chromate content to give the desired chromate content for the final reaction mix.

The following examples illustrate the production of low-carbon ferrochromium and low-carbon, low-silicon ferrochrome silicon products containing silicon in various predetermined amounts through the use of reaction mixtures of the invention comprising roasted or oxidized ore products containing chromate in various different amounts:

A reaction mixture weighing 20,450 pounds and containing 3940 pounds of chromium was formed by mixing together, intimately, roasted or oxidized ore products, ferrochrome silicon and sodium nitrate in the following proportions by weight. (The mixture consisted largely of particles small enough to pass a 100-mesh screen):

50 parts of roasted ore product containing 13.9% of iron and 18.2% of chromium and in which 35% of the chromium was present in the form of chromate.
50 parts of roasted ore product containing 17.4% of iron and 23.3% of chromium and in which 41% of the chromium was present as chromate.
68 parts of roasted ore product containing 8.6% of iron and 11.3% of chromium and in which 90.3% of the chromium was present as chromate.
94 parts of ferrochrome silicon containing

| | Per cent |
|---|---|
| Chromium | 32.00 |
| Iron | 20.00 |
| Silicon | 48.10 |
| Carbon | .03 |

33 parts of sodium nitrate (NaNO₃).

The mixture was ignited in a crucible, and the reactions were complete in about eleven and one-half minutes. Ignition and reaction produced 5,740 pounds of metal containing:

| | Per cent |
|---|---|
| Chromium | 55.4 |
| Iron | 37.4 |
| Silicon | 6.9 |
| Carbon | .028 |

Chromium recovery was about 91%. The base-acid ratio of the slag was equivalent to about 1.0 CaO to 1.0 SiO₂.

Roasted ore was in each case prepared by mixing ore and limestone and small amounts of soda, grinding to minus 100-mesh and roasting to produce the desired amount of chromate.

Lime present in the roasting charge combines with the iron oxide and alumina and chromic oxides. The resultant product contains practically no free lime (CaO). Lime preferably is adjusted in the roasted material so as to give a lime-silica ratio of not less than about .8 CaO to .1 SiO₂. This ratio has an effect on the composition and control of the silicon in the metal produced. CaO-SiO₂ ratios of 1 to 1 or more may be used advantageously if very low (1% or less) silicon in the metal is desired. In all cases, the lime preferably is mixed with the ore before roasting so that the lime will be combined with the oxides of the ore.

A reaction mixture similar to that described above but with 100 parts of ferrochrome silicon instead of 94 parts gave a metal containing 14.9% Si, 52.5% Cr and .04% C.

For production of low-carbon ferrochrome of 1% Si content or less, the above mixture, with or without the nitrate addition, may be added to an electric furnace of the Heroult type and after the exothermic reaction is over the silicon further refined from the metal by additions of chromite ore and lime or preferably a roasted lime and ore mixture, to remove the silicon to 1% or less. When not using a furnace for refining, it is preferable to roast the ore to a somewhat higher chromate content and as much as 80 to 90% of the Cr may be advantageously present as chromate. The cost of nitrate compared to the cost of producing the additional chromate will determine the advantageous amount of chromate to produce by roasting.

A reaction mixture weighing 22,400 pounds was formed by mixing together, intimately, roasted or oxidized ore, ferrochrome silicon and sodium nitrate in the following proportions by weight. (The mixture consisted largely of particles small enough to pass a 100-mesh screen):

100 parts of roasted ore containing 13.9% of iron and 18.2% of chromium and in which 35% of the chromium was present as chromate.
57 parts of roasted ore containing 8.2% of iron and 11.3% of chromium and in which 90.3% of the chromium was present as chromate.
74 parts of ferrochrome silicon containing

| | Per cent |
|---|---|
| Chromium | 32.10 |
| Iron | 20.50 |
| Silicon | 47.50 |
| Carbon | .04 |

33 parts of sodium nitrate (NaNO₃).

The reaction mixture was ignited in a crucible, and the reaction produced 6,840 pounds of metal containing:

| | Per cent |
|---|---|
| Chromium | 52.90 |
| Iron | 46.00 |
| Silicon | .28 |
| Carbon | .03 |

The recovery of chromium was equal to about 89.5%.

Sodium nitrate may be omitted from a mixture of the above type if refining is carried out in an electric furnace, of the Heroult type for example.

I claim:

1. The method of producing low-carbon ferrochromium which comprises subjecting low-carbon, high-silicon ferrochrome silicon to controlled oxidation with material resulting from the oxidation of chromite ore in the presence of lime and containing calcium chromate and unaltered chromite ore to oxidize a portion of the silicon and form modified low-carbon ferrochrome silicon relatively low in silicon, mixing low-carbon, low-silicon ferrochrome silicon thus produced with oxidizing material capable of reacting exothermically with the silicon of the ferrochrome silicon to develop sufficient heat to melt the iron and chromium of the ferrochrome silicon, and igniting the mixture thus produced.

2. The method of producing low-carbon ferrochromium which comprises subjecting low-carbon, high-silicon ferrochrome silicon containing silicon in excess of forty percent by weight to controlled oxidation with material resulting from the oxidation of chromite ore in the presence of lime and containing calcium chromate and unaltered chromite ore to oxidize a portion of the silicon and form modified low-carbon ferrochrome silicon containing less than forty percent of silicon by weight, mixing low-carbon, low-silicon ferrochrome silicon thus produced with oxidizing material capable of reacting exothermically with the silicon of the ferrochrome silicon to develop sufficient heat to melt the iron and chromium of the ferrochrome silicon, and igniting the mixture thus produced.

3. The method of producing low-carbon ferrochromium which comprises subjecting low-carbon, high-silicon ferrochrome silicon containing silicon in excess of forty percent by weight to controlled oxidation with material resulting from the oxidation of chromite ore in the presence of lime and containing calcium chromate and unaltered chromite ore to oxidize a portion of the silicon and form modified low-carbon ferrochrome silicon containing not more than about twenty percent of silicon by weight, mixing low-carbon, low-silicon ferrochrome silicon thus produced with oxidizing material capable of reacting exothermically with the silicon of the ferrochrome silicon to develop sufficient heat to melt the iron and chromium of the ferrochrome silicon, and igniting the mixture thus produced.

4. The method of preparing an exothermic mixture suitable for use in the production of alloys containing iron and chromium which comprises subjecting low-carbon, high-silicon ferrochrome silicon to controlled oxidation with material resulting from the oxidation of chromite ore in the presence of lime and containing calcium chromate and unaltered chromite ore to oxidize a portion of the silicon and form a modified ferrochrome silicon product relatively low in silicon and low in carbon, and mixing ferrochrome silicon thus obtained in finely divided form with oxidizing material capable of reacting with the silicon of the ferrochrome silicon to develop sufficient heat to melt the iron and chromium of the ferrochrome silicon.

MARVIN J. UDY.